United States Patent
Hill-Jowett

(10) Patent No.: US 9,455,829 B2
(45) Date of Patent: Sep. 27, 2016

(54) METHOD AND SYSTEM FOR DECRYPTING A TRANSPORT STREAM

(75) Inventor: David Richard Hill-Jowett, Basingstoke (GB)

(73) Assignee: Sony Europe Limited, Surrey (GB)

( * ) Notice: Subject to any disclaimer, the term of this patent is extended or adjusted under 35 U.S.C. 154(b) by 199 days.

(21) Appl. No.: 13/823,976

(22) PCT Filed: Jan. 13, 2012

(86) PCT No.: PCT/GB2012/050070
§ 371 (c)(1),
(2), (4) Date: Mar. 15, 2013

(87) PCT Pub. No.: WO2012/101420
PCT Pub. Date: Aug. 2, 2012

(65) Prior Publication Data
US 2013/0177154 A1    Jul. 11, 2013

(30) Foreign Application Priority Data
Jan. 28, 2011 (GB) .................................. 1101471.9

(51) Int. Cl.
*H04L 9/08* (2006.01)
*H04N 21/418* (2011.01)
(Continued)

(52) U.S. Cl.
CPC ........ *H04L 9/0861* (2013.01); *H04N 21/4181* (2013.01); *H04N 21/4367* (2013.01); *H04N 21/4405* (2013.01); *H04N 21/4623* (2013.01)

(58) Field of Classification Search
CPC ..................... H04N 21/4181; H04N 21/4367; H04N 21/4405
USPC .......................................................... 380/44
See application file for complete search history.

(56) References Cited

U.S. PATENT DOCUMENTS

| 6,738,905 B1 | 5/2004 | Kravitz et al. |
| 2002/0087999 A1* | 7/2002 | Kashima ....................... 725/100 |

(Continued)

FOREIGN PATENT DOCUMENTS

| EP | 1 182 874 | 2/2002 |
| EP | 1 505 474 | 2/2005 |

(Continued)

OTHER PUBLICATIONS

CI Plus, "CI Plus Specification. Content Security Extensions to the Common Interface", Jan. 2001, http://www.ci-plus.com/data/ci-plus_specification_v1.3.pdf.*

(Continued)

*Primary Examiner* — Andrew Nalven
*Assistant Examiner* — Khang Do
(74) *Attorney, Agent, or Firm* — Oblon, McClelland, Maier & Neustadt, L.L.P.

(57) ABSTRACT

A module configured in operation to connect to a host, the module including: a decryptor operable to decrypt an encrypted transport stream received from the host, the transport stream including content data and a decryption seed; a decryption key generator operable to extract the decryption seed from the transport stream and to generate a decryption key from the decryption key seed; and a secure channel generator operable to generate a secure channel between the module and the host, whereby the secure channel generator is further operable to provide the generated decryption key to the host over the secure channel.

22 Claims, 4 Drawing Sheets

(51) Int. Cl.
*H04N 21/4367* (2011.01)
*H04N 21/4405* (2011.01)
*H04N 21/4623* (2011.01)

(56) References Cited

U.S. PATENT DOCUMENTS

| | | | |
|---|---|---|---|
| 2002/0126847 A1* | 9/2002 | Wajs et al. | 380/255 |
| 2002/0170053 A1* | 11/2002 | Peterka | H04N 7/165 725/31 |
| 2006/0059512 A1* | 3/2006 | Pugel | 725/33 |
| 2010/0259678 A1 | 10/2010 | Vantalon et al. | |
| 2011/0107081 A1* | 5/2011 | Oh et al. | 713/150 |
| 2011/0293091 A1* | 12/2011 | Macchetti | H04L 9/0822 380/210 |

FOREIGN PATENT DOCUMENTS

| | | |
|---|---|---|
| EP | 2 018 059 | 1/2009 |
| FR | 2 891 104 | 3/2007 |
| WO | 99 53689 | 10/1999 |

OTHER PUBLICATIONS

CI-Plus Specification, Content Security Extensions to the Common Interface, Jan. 2011, http://www.ci-plus.com/data/ci-plus_specification_v1.3.pdf.*

Jiang, T., et al., "Secure Communication between Set-top Box and Smart Card in DTV Broadcasting," IEEE Transactions on Consumer Electronics, vol. 50, No. 3, pp. 882-886, (Aug. 1, 2004) XP 001225096.

"Functional model of a conditional access system," EBU Technical Review, No. 266, pp. 64-77, (Dec. 21, 1995) XP 000559450.

Great Britain Search Report Issued May 23, 2011 in Application No. GB1101471.9 Filed Jan. 28, 2011.

International Search Report issued Apr. 4, 2012 in PCT/GB12/50070 Flied Jan. 13, 2012.

U.S. Appl. No. 14/440,393, filed May 4, 2015, Gutta.

* cited by examiner

METHOD AND SYSTEM FOR DECRYPTING A TRANSPORT STREAM

The present invention relates to a method, module and host.

Presently, the Common Interface Plus (CI+) interface is a standard that allows data broadcasts to be scrambled before being sent over the air and descrambled at the decoder before being displayed to the user. The decoder is located in the set-top box which receives the broadcast signals. Additionally located in the set top box is a Common Interface which allows a Common Interface Conditional Access Module (or CICAM hereinafter) to be provided. In operation, the CICAM is located within the set-top box. When the broadcast signal is received, the set top box demodulates the received transport stream and sends the received transport stream to the CICAM as a demodulated stream. The CICAM then decrypts the received transport stream using the conditional access system decryption cipher and then may re-encrypt the content using a content control cipher. This data is then sent back to the set-top box where the re-encrypted data is subsequently decrypted, and viewed or stored depending on the user's preference.

Due to the large amount of bandwidth required to send two complete transport streams over the interface between the set-top box and the CICAM, it is inconvenient to have decryption for multiple tuners using this technique. It is an aim of this embodiment to therefore reduce the bandwidth of data passed over the interface between the set-top box and the CICAM.

According to a first aspect, there is provided a module configured in operation to connect to a host, the module comprising: a decryptor operable to decrypt an encrypted transport stream received from the host, the transport stream containing content data and a decryption seed; a decryption key generator operable to extract the decryption seed from the transport stream and to generate a decryption key from said decryption key seed; and a secure channel generator operable to generate a secure channel between the module and the host, whereby the secure channel generator is further operable to provide the generated decryption key to the host over the secure channel.

This is useful because only the decryption key is sent over the secure channel. Therefore, the bandwidth usage is more efficient than with the prior art.

The transport stream may further contain usage rule information and the module further comprises a usage rule generator operable to generate a nile relating to the use of the content data from the rule information in the transport stream.

The transport stream may further contain a transport stream identifier which identifies the transport stream, wherein the usage rule generator is operable to generate a rule specific to the content data of the transport stream identified by the transport identifier.

The secure channel generator may be further operable to transfer the rule relating to the use of the content over the secure channel.

The transport stream may comprise packets representing audio and/or video data.

According to another aspect, there is a host comprising an interface operable to be connected to a module according to any one of the above embodiments, the host comprising: a transport stream input operable to receive the encrypted transport stream; a module terminal operable to connect to the module, the terminal being operable to feed the encrypted transport stream to the module, the terminal being further operable to receive the decryption key from the module; and a decrypter operable to decrypt the encrypted transport stream using the received decryption key.

The host may further comprise a usage rule device operable to receive, from the module terminal, the usage rule information, and to generate a usage rule on the basis thereof; and a storage medium operable to store the usage rule in association with the decrypted transport stream.

The usage rule device may be operable to extract the transport stream identifier from the usage rule information, and the storage medium is operable to store the usage information in association with the identified transport stream on the storage medium.

The transport stream may comprise packets representing audio and/or video data.

According to another aspect, there is provided a system comprising a module according to any one of the embodiments connected to a host according to any one of the embodiments.

According to another aspect, there is provided a method of generating a decryption key in a module and providing the generated decryption key to a host, the method comprising: decrypting a received encrypted transport stream, the transport stream containing content data and a decryption seed; extracting the decryption seed from the transport stream; generating a decryption key from said decryption key seed; generating a secure channel between the module and the host; and providing the generated decryption key to the host over the secure channel.

The transport stream may further contain usage rule information and the method further comprises generating a rule relating to the use of the content data from the rule information in the transport stream.

The transport stream may further contain a transport stream identifier which identifies the transport stream, and the method further comprises: generating a rule specific to the content data of the transport stream identified by the transport identifier.

The method may further comprise transferring the rule relating to the use of the content over the secure channel.

The transport stream may comprise packets representing audio and/or video data.

The method may further comprise: receiving the encrypted transport stream; feeding the encrypted transport stream to a module, and receiving the decryption key from the module; and decrypting the encrypted transport stream using the received decryption key.

The method may further comprise receiving, from the module, the usage rule information, and generating a usage rule on the basis thereof; and storing the usage rule in association with the decrypted transport stream.

The method may further comprise extracting the transport stream identifier from the usage rule information, and storing the usage information in association with the identified transport stream.

The transport stream may comprise packets representing audio and/or video data.

According to another aspect, there is provided a computer program comprising computer readable instructions, which when loaded onto a computer configure the computer to perform a method according to any one of the embodiments.

A storage medium configured to store the computer program therein or thereon is also provided.

Embodiments of the present invention are described by way of example only and with reference to the following drawings, in which.

Figure 1:
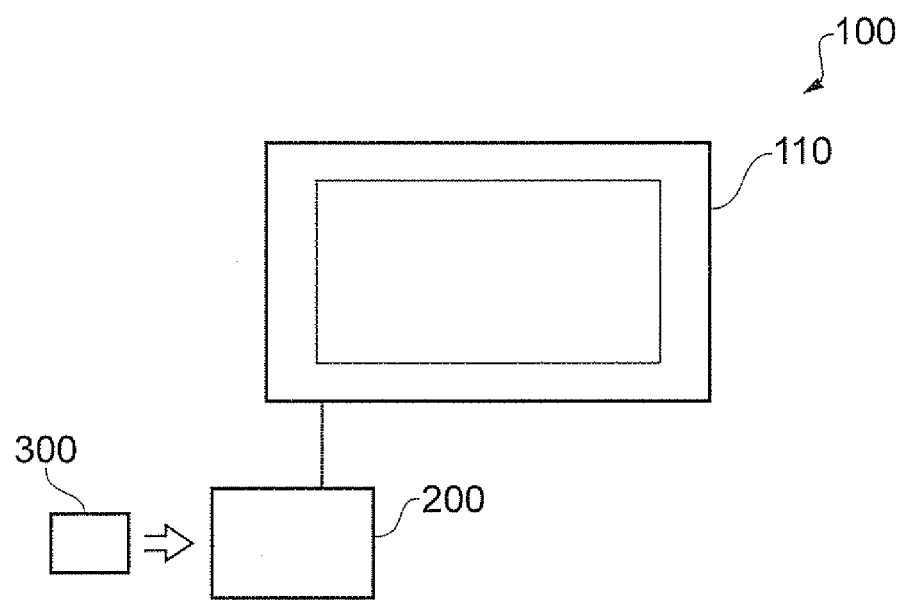
FIG. 1 shows a television and set-top box arrangement according to embodiments of the present invention.

A television and set-top box arrangement 100 is shown in FIG. 1. In this arrangement 100, a set-top box 200 (which is one example of a host) is connected to a television 110. The set-top box 200 receives television signals and other digital data such as closed caption information and Electronic Program Guide information. The set-top box 200 may receive other data broadcast over a terrestrial network, cable network, satellite network or Internet Protocol (IP) content. In embodiments of the present invention, the set top box 200 receives encrypted digital data in a transport stream.

The set-top box 200 has a slot to receive a CICAM module 300. The CICAM module 300 is used to control access to the received data. The CICAM module 300 will be described in more detail with reference to FIG. 3. The CICAM module 300 allows conditional access to some or all of the encrypted data. Typically, the CICAM module 300 allows access to subscription type channels and different pay-per-view events. However, there are many other applications for the CICAM module 300 within the set-top box 200. For example, the CICAM module 300 may be used to block access to certain channels (sometimes called "services") or programmes depending on user or parental choice.

The CICAM module 300 may be inserted into a PC card slot (sometimes referred to as a Personal Computer Memory Card International Association) within the set-top box 200. However, the invention is not so limited and the CICAM module 300 may take any suitable form such as a USB device. The television 110 is connected to the set-top box 200 using a cable. This may be a High Definition Multimedia Interface (HDMI) cable or any other appropriate cable. Indeed, the set-top box 200 may be integrated into the television 110, which is sometimes referred to as an integrated digital television (IDTV). In this case, the CICAM module 300 would be inserted directly into the PCMCIA slot located within the television 110 as is mandated for IDTVs over a certain size in Europe.

Figure 2:
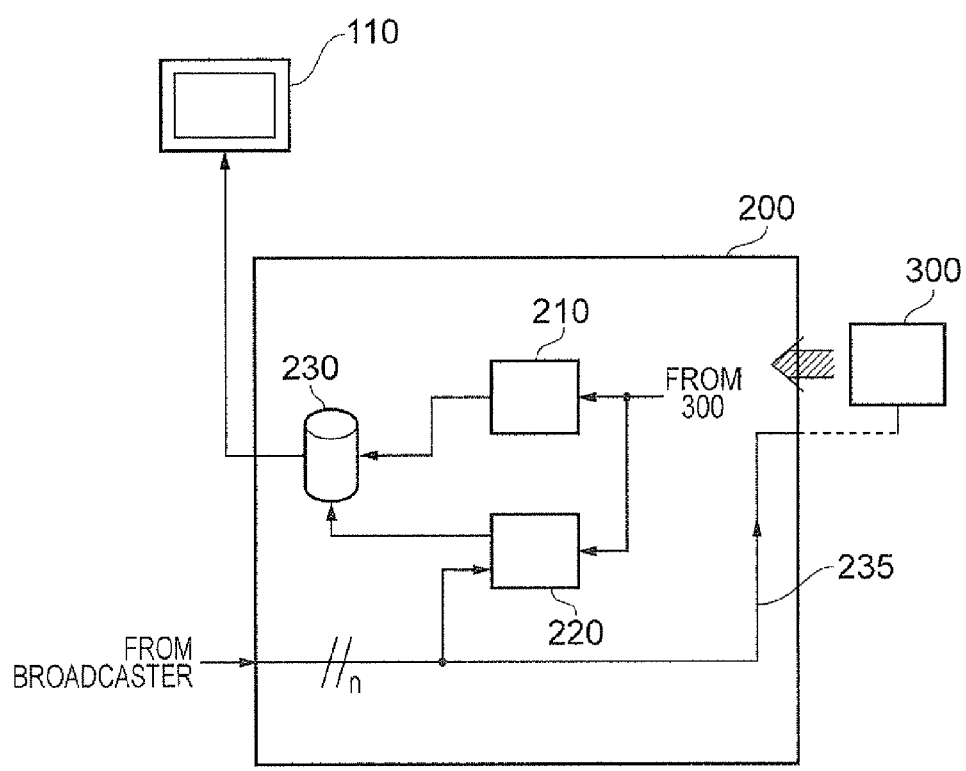
FIG. 2 shows the set-top box and CICAM module of embodiments of FIG. 1 in more detail.

FIG. 2 shows a more detailed diagram of the set-top box 200. As in FIG. 1, the set-top box 200 is connected to the television 110. Also, the CICAM module 300 is shown being inserted into the set-top box 200. The set-top box 200 is, in use, connected to an antenna. The antenna receives the digital television signals, and any other data, from a broadcaster as a transport stream. Clearly, the transport stream may be received from a satellite dish, or from a cable broadcaster as appropriate. Moreover, the transport stream may be received over the Internet. In the Internet example, the transport stream will not necessarily be broadcast to a number of different set-top boxes and may be more specific to the individual user. It should be noted here that the received transport stream may include just a single service, or may include a plurality of services. Specifically, in embodiments of the present invention, other parts of the set top box 200, there may be multiple tuners. This would allow the set top box 200 to process multiple transport streams. In order to illustrate this, there are n lines illustrated in FIG. 2. The received transport stream(s) are fed into the CICAM 300 using connection 235.

The received signals form a scrambled transport stream and are fed into the CICAM module 300. However, for ease of explanation, the function of the set top box 200 with a single transport stream will be explained.

The transport stream is scrambled using the Common Scrambling Algorithm (CSA). The CSA is used to scramble Digital Video Broadcast (DVB) signals as would be appreciated. As the CSA is known to the skilled person, no further discussion will be provided hereinafter. Additionally provided by the broadcaster are the Entitlement Control Message (ECM) and the Entitlement Management Message (EMM). These are used to determine the decryption key used to descramble the scrambled DVB signals.

The received transport stream is fed into a descrambler 220. The descrambler 220 also demultiplexes the received transport stream. The descrambler 220 descrambles the received transport stream using the control word provided by the CICAM 300 as would be explained later. Additionally, the demultiplexed transport stream is stored in a CSA unencrypted format on a storage medium 230. In embodiments, the storage medium 230 is a hard disk drive. However, the invention is not so limited. The storage medium may be an optical disk, solid state memory or any suitable kind of memory. In fact, the storage medium 230 may be integrated into the set top box 200 or may be removable therefrom. The storage medium may indeed be remote to the set top box 200, for example located in a computer which is remote to the set top box 200. The computer and set top box 200 may be connected over a network.

Additionally connected to the storage medium 230 is a content management block 210. The content management block 210 stores usage rules which define at least one criterion upon which the received decrypted program can be viewed. The usage rules are stored with the decrypted content on the storage medium 230. The usage rules may consist of user defined rules such as parental control using a Personal Identification Number (PIN), or may be broadcaster defined rules such as a period of time the content may be stored on the storage medium 230 or may be both. These usage rules are provided to the set top box 200 by the CICAM 300 as will be explained later.

Figure 3:
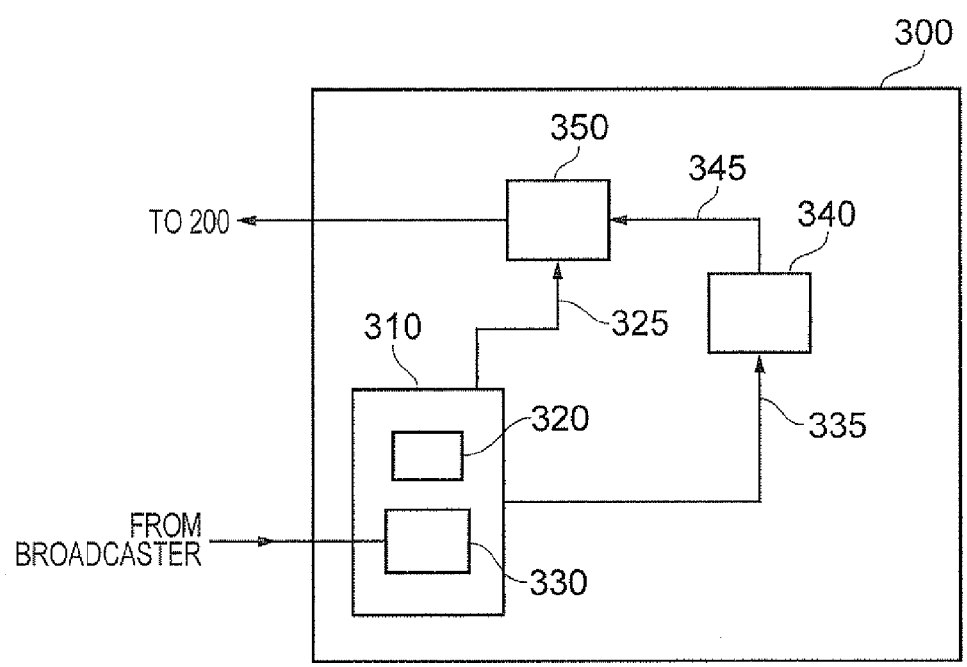
FIG. 3 shows the CICAM module of embodiments of FIG. 1 in more detail.

Referring to FIG. 3, the CICAM 300 is shown in more detail. The received signal from the broadcaster is fed into a conditional access system 310 located within the CICAM 300. The conditional access system 310 uses the ECM and EMM data received from the broadcaster to generate the control word and any usage rules provided by the user or the broadcaster or both. The control word is generated in a control word generator 320. The usage rules are generated using an ECM/EMM filter and manager 330. The usage rules are fed into a content manager 340 over line 335. The content manager 340 associates the usage rules generated within the conditional access system 310 with a particular transport stream. Additionally, the content manager 340 also provides licence information and other data such as parental control data, or may indicate the length of time or number of replays of the content permitted.

The output 345 of the content manager 340 is provided to a secure authentication channel (SAC) generator 350. The SAC generator 350 generates a secure authenticated channel between the CICAM 300 and the set top box 200. The SAC is generated when the CICAM 300 and the set top box mutually authenticate with each other, as would be appreciated by the skilled person. The SAC provides a secure mechanism over which data produced by the CICAM 300 can be communicated to the set top box 200 and vice versa. This information is passed to the set top box 200 where the usage rules are provided to the content management block 210 and the control word is provided to the descrambler 220.

The operation of the set top box 200 with the CICAM 300 inserted therein will now be described.

Prior to the transport stream requiring decryption being sent by the broadcaster, the ECM for the particular transport stream is sent by the broadcaster to the set top box. The set top box 200 receives the ECM and passes the ECM to the CICAM 300. The CICAM 300 stores the ECM in the ECM/EMM filter and manager 330. It should be noted that the ECM is transmitted to many set top boxes. A short time later, the broadcaster selectively sends the EMM. Upon receipt of the EMM, the ECM/EMM filter and manager 330 generates the control word in accordance with the received ECM. In other words, each set top box receives the ECM, but the CICAM 300 will only generate the control word used to decrypt the forthcoming transport stream after an appropriate EMM is received by the CICAM 300. In order to perform this, the CICAM 300 may interrogate a smart card (not shown) inserted therein. The smart card is typically provided by the broadcaster. However, the invention is not so limited and the CICAM 300 may generate the control word without a smart card being inserted therein, for example if the broadcaster provides the required information over some other secure channel. The ECM and EMM are refreshed many times a day to ensure the security of the system. The control word is fed to the SAC generator 350. The control word will be sent over the SAC with other information as will now be explained.

The new ECM from which the control word is generated is sent along with the transport stream which is to be decrypted using the control word. However, in order to provide time for the CICAM 300 to generate the control word, the broadcaster provides a slight delay between sending the transport stream containing the new ECM and the transport stream requiring decoding using the new control word. When the transport stream which is to be decrypted using the control word is received, the transport stream contains data other than the image data. This data includes a transport stream identifier, a usage rule indicator, licence information relating to the content within the transport stream, closed caption information and other metadata. In the context of this description, metadata broadly refers to data about data and/or the content of the data and contains less information than the data and/or content to which it refers.

The transport stream identifier is, in embodiments, a 13 bit packet which identifies the transport stream. A usage rule indicator identifies certain attributes of the content of the transport stream. For example, the usage rule indicator identifies any relevant feature of the content, for example if the content is meant for an adult audience because it contains violent scenes or the like. Additionally, the usage rule indicator may identify any other relevant attribute of the content of the transport stream. The licence information relating to the content indicates how long the content may be stored on a personal video recorder, for example. However, the licence information may include any other relevant information relating to the content or the use of the content, such as a maximum number of viewings of the content permitted to the user.

After descrambling the transport stream, the ECM/EMM filter 330 extracts the transport stream identifier, the usage rule indicator and the licence information. This information is passed to the content manager 340. The content manager 340 analyses the extracted information, and in particular, the usage rule indicator to see if the content should be displayed to the viewer. In particular, if the content is meant for an adult audience, the owner of the set-top box 200 may have asked that a personal identification number (PIN) be provided before displaying the content. The PIN is stored in an encrypted manner within the content manager 340 and if a PIN is required, the content manager 340 prompts the set top box 200 to display a request to the user for a PIN. The content manager 340 receives the PIN input by the user and, in the event of a match, allows the content to be displayed. If not, the content manager 340 does not authorise the content to be displayed.

The control word is fed into the SAC generator 350 over line 325. Within the SAC generator 350, a secure authentication channel message (SAC message) is generated. The SAC message contains the control word for the particular transport stream, the usage rule indicator, the licence information, the transport stream identifier and any other data, such as closed caption information or metadata associated with the particular transport stream. The SAC message is then passed to the set-top box 200 over the secure access channel created by the SAC generator 350.

It should be noted here that the transport stream itself is not passed over the SAC. This reduces the amount of data passed between the CICAM 300 and the set top box 200. This improves the bandwidth usage of the interface between the CICAM 300 and the set top box 200 enabling many more transport streams to be decrypted by the set top box 200.

The SAC message is fed into the content management block 210 and the descrambler 220 of FIG. 2. The descrambler 220 extracts the control word from the SAC message and uses the control word to descramble the transport stream with the particular transport stream identifier. In order to do this, the skilled person would appreciate that some buffering of the received encrypted transport stream may be required. Therefore, although not shown, the descrambler 220 may have some buffer memory contained therein to buffer the appropriate transport stream. The content management block 210 extracts the usage rule indicator, the license information and any other data from the SAC message. The content management block 210 uses the extracted information to formulate rules. For example, the content management block 210 may use the licence information extracted from the SAC message to generate a content expiry date indicating the date before which the content can be played. The content management block 210 stores the extracted information in association with the descrambled transport stream on the storage medium 230. This may or may not be stored on the same storage medium, but links the rules to the appropriate piece of content.

The user may then view the content from the storage medium 230 on the display 110 depending on the licence information and the usage rules.

Although the foregoing has been described with reference to a set top box 200 used in receiving DVB signals, the invention is not so limited. In fact, the present invention may be embodied in any type of host. A host can generally be defines as a device where modules can be connected. Some examples of a host include an integrated receiver device or a recorder. So, the invention may be embodied in a host capable of receiving any type of data over any type of network. One such example may be a gateway connected to a network. The network may be a local network in a user's home or business which connects one or more hosts to the Internet or some other type of network. This different form of host (embodied as a gateway) is described with reference to FIG. 4.

Figure 4:
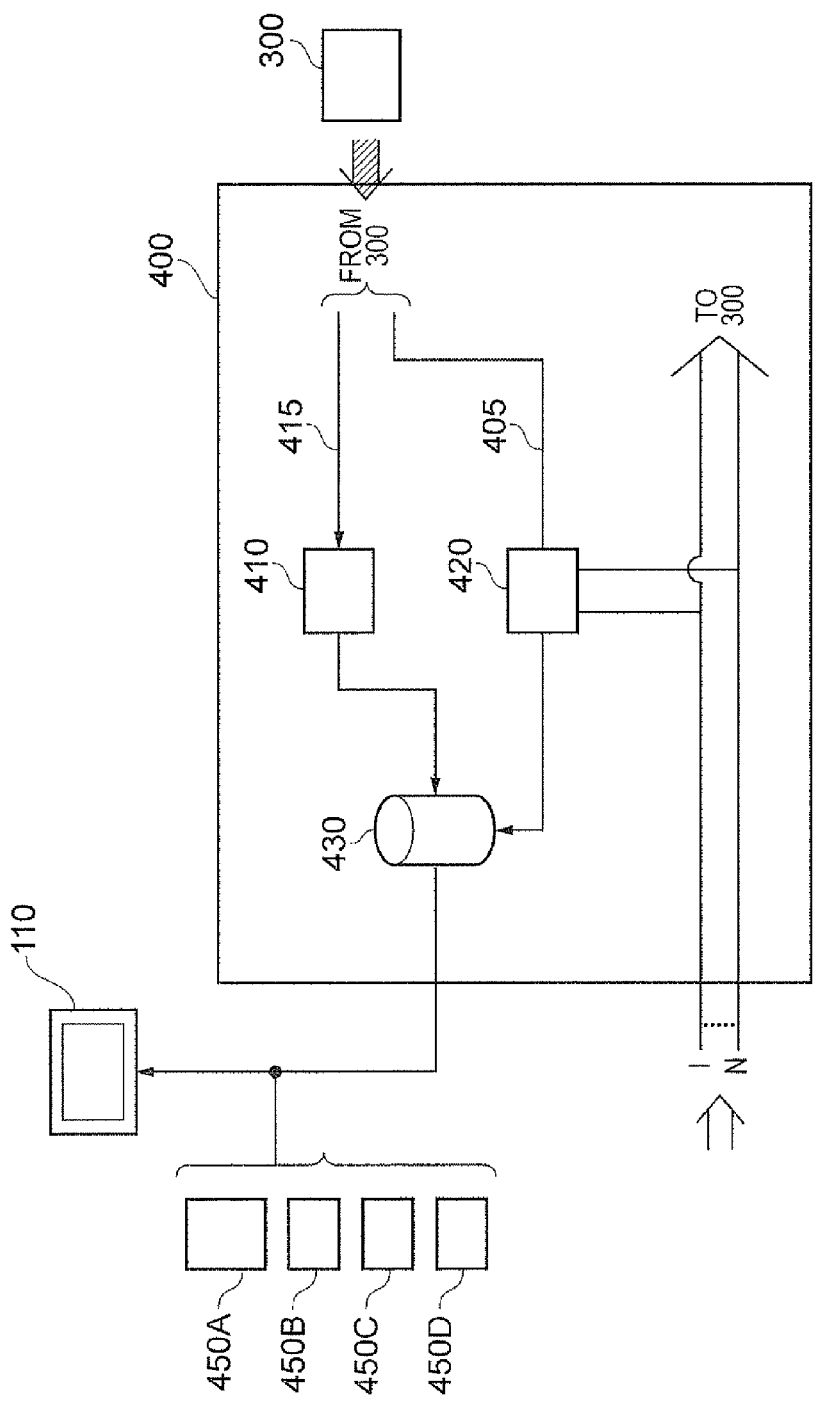
FIG. 4 shows a diagram explaining a different host embodiment of the present invention.

In FIG. 4, a gateway 400 is illustrated. The gateway 400 has numerous inputs from internal tuners (not shown) or may receive Internet Protocol (IP) packets transferred over the Internet using the High Bandwidth Digital Content Protection (HDCP) or the Digital Transmission Content Protection (DTCP) protocols. However, the invention is not limited and any encrypted data may be received.

As in the example set forth in respect of FIG. 3, the received data in the gateway 400 is encrypted and includes information enabling a control word or the like to be generated within a CICAM located within the gateway 400. In other words, the CICAM 300 in the gateway 400 will generate the control word in a similar manner to that described with reference to FIG. 3. Similarly, in the gateway form factor, the received data, in embodiments, will also include a transport stream identifier, or the like, which identifies the transport stream; usage rule indicators which identifies any relevant information relating to the content of the received data, such as from which website the data is received; licence information identifying limitations on the licence of the content, for example an expiry date upon which the data should be deleted; and any other data, such as metadata. It should be noted here that in order for the host (irrespective of whether the host is embodied as a set-top box 200 or the gateway 400) to operate correctly, only the data enabling the control word, or any such decrypting key, is required. The other data noted above is merely exemplary.

In FIG. 3, the interface between the CICAM 300 and the set top box 200 was a SAC interface. However, the invention is not so limited. In embodiments relating to FIG. 4, the interface may be a USB 2.0 interface, or any other appropriate secure interface. A message equivalent to the SAC message described with reference to FIG. 3 is passed between the CICAM 300 and the gateway 400. In other words, the message passed between the CICAM 300 and the gateway 400 will contain similar data to that of FIG. 3, but the formatting of the message will be specific to the protocol used in FIG. 4, such as USB 2.0.

The message will be fed to both a gateway descrambler 420 and a gateway content management block 410 over lines 405 and 415 respectively. The gateway descrambler 420 extracts the control word generated by the CICAM 300 and descrambles the appropriate part of the USB 2.0 message using the control word. Similarly, the gateway content management block 410 generates rules from the received USB 2.0 message. The gateway content management block 410 stores these rules in association with the appropriate content on the storage medium 430. As explained before, the gateway descrambler 420 descrambles the encrypted content using the control word and stores this on the storage medium 430. The content may be displayed to the user on a display 110, or may be accessed by any number of client devices on the network 450A-450N. The client devices may be one or more computer, games console, handheld device or display device or similar connected to the gateway 400 over a network or remotely via the Internet or the like.

Although the foregoing has been explained with the SAC message being fed into the content management block, the invention is not so limited. For example, the SAC message may be fed into a routing device within the set top box 200 which directs the segments of the message to the appropriate block within the set top box 200 or the gateway 400 or more generally, any host.

Although the foregoing has been explained with the control word being sent directly to the SAC generator, with the other data being sent to the content manager, the invention is not so limited. Data can be sent directly to the SAC generator or to the content manager as required.

Although the foregoing describes storing the data before it is viewed or used by a user, the invention is not so limited. The data can be viewed or used directly by the user or any one of the host devices on the network with or without the data being stored.

It should also be noted here that the set top box 200 does not need to receive the control word over the SAC for every transport stream. It is possible for the control word to be stored within the set top box 200 in secure memory and then only the control word when changed needs to be transferred from the CICAM 300. Indeed, in embodiments, the control word may simply be a flag which indicates that the set top box should use the previously transferred control word with one particular identified transport stream. This would reduce the bandwidth used even further.

Although the foregoing has described the set top box 200 and gateway 400 as containing distinct blocks, in embodiments of the present invention, the functionality of the blocks may be provided by computer software. The computer software contains computer readable instructions which, when loaded onto a computer configure the computer to perform such functionality. The computer software may be stored on the storage medium 230 or 430. Alternatively, the software may be stored on any memory device such as semiconductor memory, or optical readable memory or the like. This may be within the device or remote from the device on a server or the like which is connectable to the device over a network.

The invention claimed is:

1. A module configured to connect to a host, the module comprising:
   decryptor circuitry configured to decrypt an encrypted transport stream received from the host, the encrypted transport stream including content data and a decryption seed;
   a decryption key generator configured to extract the decryption seed from the encrypted transport stream and to generate a decryption key from the decryption seed;
   a secure channel generator configured to generate a secure channel between the module and the host, generate a message including at least the decryption key associated with the encrypted transport stream, and provide the message to the host over the secure channel without a flag only when the decryption key has changed from a previously provided decryption key, the flag indicating that the host should use the previously provided decryption key instead of the decryption key; and
   the secure channel generator further configured to generate a message including the flag without a decryption key and provide the message to the host over the secure channel.

2. The module according to claim 1, wherein the encrypted transport stream further includes usage rule information and the module further comprises a usage rule generator operable to generate a rule relating to use of the content data from the usage rule information in the encrypted transport stream.

3. The module according to claim 2, wherein the encrypted transport stream further includes a transport stream identifier which identifies the encrypted transport stream, wherein the usage rule generator is configured to generate a rule specific to the content data of the encrypted transport stream identified by the transport identifier.

4. The module according to claim 2, wherein secure channel generator is further configured to transfer the rule relating to the use of the content over the secure channel.

5. The module according to claim 1, wherein the encrypted transport stream comprises packets representing audio and/or video data.

6. The module according to claim 1, wherein the message further includes a usage rule indicator, a license information, and a transport stream identifier associated with the encrypted transport stream while the encrypted transport stream itself is not included in the message for reducing an amount of data passed between the module and the host.

7. The module according to claim 1, further comprising:
a manager configured to receive the encrypted transport stream from a broadcaster with a delay time within which the decryption key generator generates the decryption key.

8. A host circuitry comprising an interface configured to be connected to a module, a host comprising:
transport stream input circuitry configured to receive an encrypted transport stream;
a terminal configured to connect to the module, the terminal being configured to feed the encrypted transport stream to the module, the terminal being further configured to receive a message without a flag only when a decryption key has changed from a previously provided decryption key, the flag indicating that the host should use the previously provided decryption key instead of the decryption key, the message including at least the decryption key associated with the encrypted transport stream, from the module via a secure channel, the decryption key having been generated from a decryption seed extracted from the encrypted transport stream;
decryptor circuitry configured to decrypt the encrypted transport stream using the decryption key in the message;
the terminal further configured to receive a message including the flag without the decryption key from the module via the secure channel; and
the decryptor circuitry further configured to decrypt the encrypted transport stream using the previously provided decryption key instead of the decryption key according to the indication of the flag.

9. The host circuitry according to claim 8, further comprising:
usage rule circuitry configured to receive, from the terminal, usage rule information, and to generate a usage rule on the basis thereof; and
a storage medium operable to store the usage rule in association with the decrypted transport stream.

10. The host circuitry according to claim 9, wherein the usage rule circuitry is configured to extract a transport stream identifier from the usage rule information, and the storage medium is configured to store the usage information in association with the identified transport stream on the storage medium.

11. The host circuitry according to claim 8, wherein the encrypted transport stream comprises packets representing audio and/or video data.

12. A system comprising:
a module connected to a host;
the module comprising:
decryptor circuitry configured to decrypt an encrypted transport stream received from the host, the encrypted transport stream including content data and a decryption seed;
a decryption key generator configured to extract the decryption seed from the encrypted transport stream and to generate a decryption key from the decryption seed; and
a secure channel generator configured to generate a secure channel between the module and the host, generate a message including at least the decryption key associated with the encrypted transport stream, and provide the message to the host over the secure channel without a flag only when the decryption key has changed from a previously provided decryption key, the flag indicating that the host should use the previously provided decryption key instead of the decryption key;
the secure channel generator further configured to generate a message including the flag without the decryption key and provide the message to the host over the secure channel;
the host comprising:
transport stream input circuitry configured to receive an encrypted transport stream;
a terminal configured to connect to the module, the terminal being configured to feed the encrypted transport stream to the module, the terminal being further configured to receive a message from the module; and
decryptor circuitry configured to decrypt the encrypted transport stream using the decryption key in the message or using the previously provided decryption key according to the indication of the flag.

13. A method of generating a decryption key in a module and providing the generated decryption key to a host, the method comprising:
decrypting a received encrypted transport stream, the encrypted transport stream including content data and a decryption seed;
extracting the decryption seed from the encrypted transport stream;
generating a decryption key from the decryption seed;
generating a secure channel between the module and the host by secure channel generator circuitry;
generating a message including at least the decryption key associated with the encrypted transport stream without a flag only when the decryption key has changed from a previously provided decryption key, the flag indicating that the host should use the previously provided decryption key instead of the decryption key;
providing the generated message to the host over the secure channel;
generating a message including the flag without the decryption key; and
providing the generated message including the flag without the decryption key to the host over the secure channel.

14. The method according to claim 13, wherein the encrypted transport stream further includes usage rule information and the method further comprises:
generating a rule relating to use of the content data from the usage rule information in the encrypted transport stream.

15. The method according to claim 14, wherein the encrypted transport stream further includes a transport stream identifier which identifies the encrypted transport stream, and the method further comprises:
generating a rule specific to the content data of the encrypted transport stream identified by the transport identifier.

16. The method according claim 14, further comprising transferring the rule relating to the use of the content over the secure channel.

17. The method according to claim 13, wherein the encrypted transport stream comprises packets representing audio and/or video data.

18. The method according to claim 13, further comprising:
receiving the encrypted transport stream;
feeding the encrypted transport stream to a module, and receiving the decryption key from the module; and
decrypting the encrypted transport stream using the received decryption key.

19. The method according to claim 18, further comprising:
receiving, from the module, usage rule information, and generating a usage rule on the basis thereof; and
storing the usage rule in association with the decrypted transport stream on a storage medium.

20. The method according to claim 19, further comprising:
extracting a transport stream identifier from the usage rule information; and
storing on a storage medium the usage information in association with the identified transport stream.

21. The method according to claim 18, wherein the encrypted transport stream comprises packets representing audio and/or video data.

22. A non-transitory computer readable medium comprising computer readable instructions, which when executed on a computer configure the computer to perform a method, the method comprising:
decrypting a received encrypted transport stream, the encrypted transport stream including content data and a decryption seed;
extracting the decryption seed from the encrypted transport stream;
generating a decryption key from the decryption seed;
generating a secure channel between a module and a host;
generating a message including at least the decryption key associated with the encrypted transport stream without a flag only when a decryption key has changed from a previously provided decryption key, the flag indicating that the host should use a previously provided decryption key instead of the decryption key;
providing the generated message to the host over the secure channel;
generating a message including the flag without the decryption key; and
providing the generated message including the flag without the decryption key to the host over the secure channel.

* * * * *